US006001552A

United States Patent [19]

Cooper

[11] Patent Number: 6,001,552

[45] Date of Patent: Dec. 14, 1999

[54] METHOD FOR SUPPORTING THE LIFE OF A PREMATURE BABY

[76] Inventor: William I. Cooper, 300 N. Fourteenth St., Easton, Pa. 18042

[21] Appl. No.: 09/109,631

[22] Filed: Jul. 2, 1998

Related U.S. Application Data

[60] Continuation-in-part of application No. 08/483,978, Jun. 7, 1995, abandoned, which is a division of application No. 08/658,698, Feb. 21, 1991, Pat. No. 5,218,985.

[51] Int. Cl.$^{6}$ .............................. A01N 1/00; A01N 1/02; A61G 10/00; A62B 31/00

[52] U.S. Cl. ............................ 435/1.1; 435/2; 424/93.1; 514/56; 600/21; 600/22; 128/202.12; 128/202.13; 128/202.14; 128/202.15; 128/202.16; 128/205.26

[58] Field of Search ................................ 435/1.1, 2, 366, 435/395, 404, 283.1, 289.1, 307.1; 424/93.1, 93.21, 93.7; 514/56; 600/21, 22; 128/202.12–202.16, 205.26

[56] References Cited

U.S. PATENT DOCUMENTS

| | | | |
|---|---|---|---|
| 3,862,002 | 1/1975 | Sanders | 435/52 |
| 4,093,515 | 6/1978 | Kolobow | 435/2 |
| 5,207,639 | 5/1993 | Cooper | 604/4 |
| 5,218,958 | 6/1993 | Cooper | 128/205.26 |

*Primary Examiner*—Leon B. Lankford, Jr.
*Assistant Examiner*—Christopher R. Tate
*Attorney, Agent, or Firm*—Head, Johnson & Kachigian

[57] ABSTRACT

A method for supporting the life of a baby which was born too prematurely to have functioning lungs and remains attached to its placenta through its umbilical cord. The placenta is maintained in a moist, oxygen containing environment while it is contacted with a liquid composition containing nutrients, an anticoagulant, and red blood cells in a concentration by volume from about lot to about 30%.

5 Claims, 1 Drawing Sheet

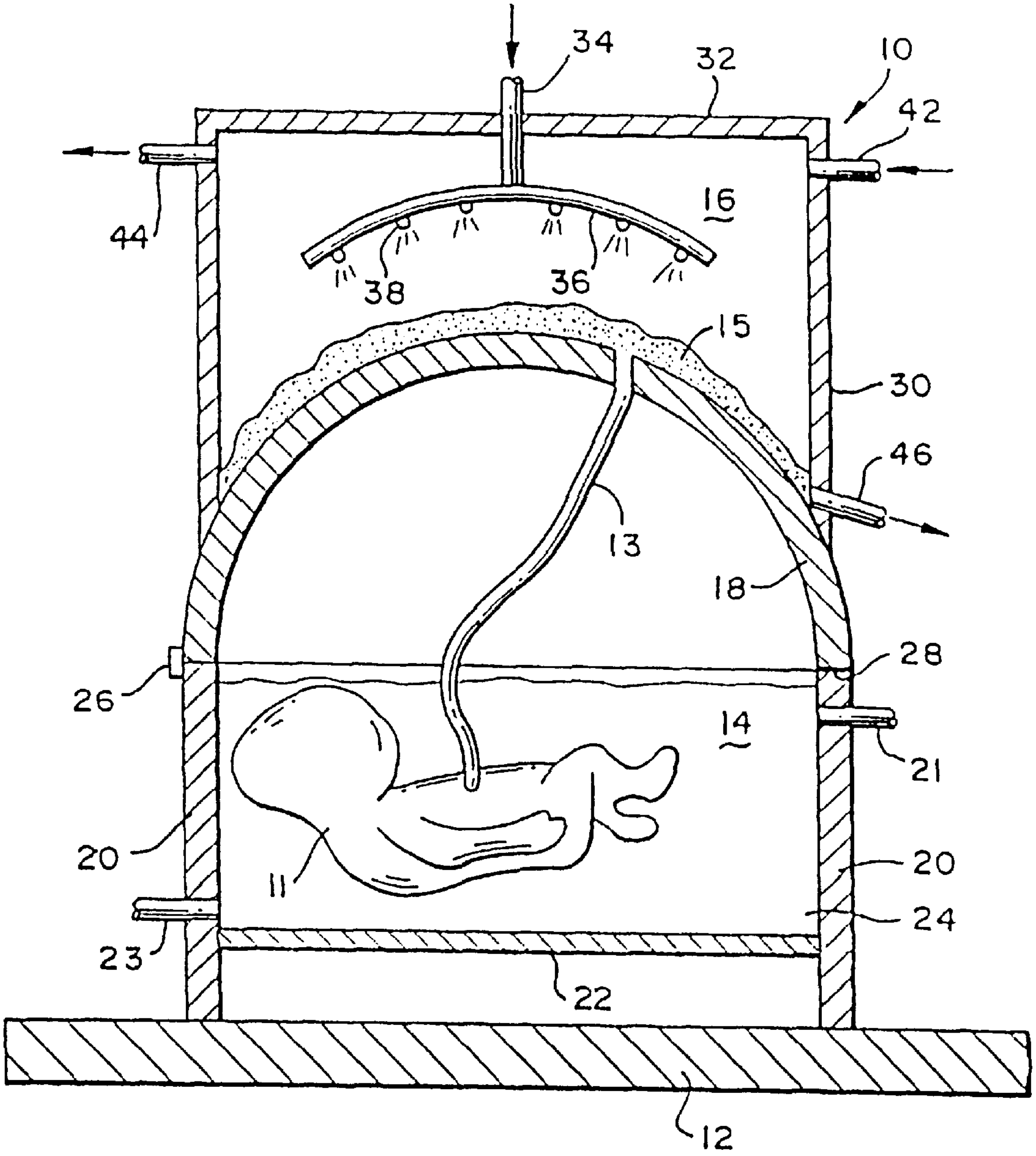
34
32
10
42
16
44
38
36
15
30
46
13
18
26
28
14
21
20
11
20
24
23
22
12

METHOD FOR SUPPORTING THE LIFE OF A PREMATURE BABY

RELATED PATENTS AND APPLICATIONS

This is a continuation-in-part of Application Ser. No. 08/483,978 filed Jun. 7, 1995, now abandoned, which is a divisional of Application Ser. No. 08/658,698 filed Feb. 21, 1991, which issued as U.S. Pat. No. 5,218,958 which are incorporated herein by reference.

FIELD OF THE INVENTION

The present invention relates to methods for supporting the life of a prematurely born baby and more particularly to a composition for supplying such a baby with nutrients and oxygen.

BACKGROUND OF THE INVENTION

U.S. Pat. No. 5,218,985 to William I. Cooper describes apparatus for supporting the life of a prematurely born baby by replacing the functions of the uterus after the baby and placenta have been surgically removed in a sterile environment. This apparatus supports the life of the baby by supplying nutrients and oxygen through the placenta which remains attached to the baby via the umbilical cord. Means are provided for spraying a solution containing nutrients onto the placenta which is in contact with gaseous oxygen. The present invention provides a solution for supplying the placenta with nutrients and oxygen.

SUMMARY OF THE INVENTION

In accordance with the present invention, there is provided a method for supporting the life of a baby which was born too prematurely to have functioning lungs. The baby remains attached to its placenta through its umbilical cord and the placenta is maintained in a moist, oxygen-containing environment while it is contacted with a liquid composition containing nutrients, red blood cells in a concentration by volume from about 10% to about 30%, and Heparin, an anti-coagulant.

The liquid composition comprises the elements as shown below in Table 1.

TABLE 1

Nutrient Solution

| Composition | Concentration |
|---|---|
| Whole Human Blood (which includes red blood cells, typically 35–40% concentratation) or Packed Red Blood Cells | Approximately 25% of red blood cells in final solution |
| Liquid Composition Containing Nutrients | Approximately 35% |
| Heparin, an anti-coagulant | 1000 u/liter of Liquid Composition Containing Nutrients |
| Blood Serum or physilogic (electrolyte balanced) solution | Remainder |

With respect to the whole human blood, typically the percentage of red blood cells contained within the whole human blood is between 35% and 40%. In the present invention, the whole human blood is diluted by the liquid composition discussed below. The human blood is diluted to a level where the percentage of red blood cells is approximately between 10% and 30%, with a 25% percentage being most preferred.

The liquid composition containing nutrients is a composition of elements used for the maintenance and development of fetal life and growth. The terms "nutrients" and "liquid nutrients" refer to this liquid composition. The composition and concentrations of the elements contained in the liquid are contained the in Tables 2–5 below.

TABLE 2

Nutrients

| Composition | Concentratjon |
|---|---|
| Crystalline Amino Acid | 8.5%/500 ml |
| Hepatamine | 8.0%/500 ml |
| RenAmin | 13.0%/500 ml |
| Multiple Vitamin Concentrate | 10 ml/day |
| Multple Trace Elements Concentrate | 1 ml/day |
| Electrolye Additivies | quantity sufficient to maintain normal human plasma levels |
| Glucose | 5%/500 ml |

TABLE 3

Content of Multivitamin Concentrate

| Vitamin | Dose per 10 ml |
|---|---|
| Vitamin A (retinol) | 3300 I.U. |
| Vitamin C (ascorbid acid) | 100 mg |
| Vitamin D (ergo Calciferol) | 200 I.U. |
| Vitamin $B^1$ (thiamine) | 3.0 mg |
| Vitarnin $B^2$ (riboflavin) | 3.6 mg |
| Vitamin B6 (pyridoxine) | 4.0 mg |
| Vitamin B12 (cyanocobalamin) | 5 mcg |
| Vitamin E | 10 I.U. |
| Biotin | 60 mcg |
| Folic Acid | 400 mcg |
| Niacinamide | 40.0 mg |
| Pantothenic Acid | 15.0 mg |

TABLE 4

Content of Trace Element Concentrate

| Trace Element | Dose per ml |
|---|---|
| Zinc | 5.0 mg |
| Copper | 1.0 mg |
| Manganese | 0.5 mg |
| Chromium | 10.0 mcg |

TABLE 5

| Electrolyte Additives |
|---|
| Sodium Chloride |
| Sodium Acetate |
| Sodium Phosphate |
| Potassium Chloride |
| Potassium Phosphate |
| Calcium Gluconate |
| Magnesium Sulfate |

The pH of the fluid composition is between 7.2 and 7.4. The preferred pH is 7.35 (by carbonate buffered).

The present invention provides the advantage that oxygen is transferred to fetal red bloodcells through the placenta not only from oxygen-containing gas in contact therewith but also from the red blood cells in the composition in contact with the placenta. The transfer of oxygen from red blood cells in the composition to red blood cells in the placenta is enhanced by the affinity of the fetal red blood cells for oxygen which is greater than that of normal maternal red blood cells.

BRIEF DESCRIPTION OF THE DRAWINGS

The FIGURE is a vertical view of one embodiment of apparatus useful in practicing the present invention.

DETAILED DESCRIPTION OF THE INVENTION

The present invention will be described in detail as it may be carried out by the apparatus shown in the FIGURE. As shown in the FIGURE a life support system 10 for a baby 11 includes a base 12, a lower chamber 14, an upper chamber 16 and a dome 18 which separates the upper and lower chambers from each other. Lower chamber 14 is defined by bottom wall 22, sidewall 20 and the lower surface of dome 18. Upper chamber 16 is defined by sidewall 30, top wall 32 and the upper surface of dome 18. Upper chamber 16 provides an air-tight and water-tight seal at the point of contact between wall 30 and the outer surface of dome 18 which is secured to wall 20 by an hinge 26. An elastomeric seal member (not shown) is present at the point of contact.

Upper and lower chambers 16, 14 respectively, and the dome 18 separating the two chambers, may be made of a variety of materials which are inert to the materials in contact with the chamber and dome. The preferred materials are transparent and most preferably are transparent disposable, non-toxic plastics.

As shown in the FIGURE, the lower part of lower chamber 14 contains physiological fluid 24 for suspending baby 11 which remains connected to placenta 15 through umbilical cord 13. An inlet 21 and an outlet 23 are provided for introducing physiological fluid into and removing physiological fluid from chamber 14. The physiological fluid 24 is a salt solution which serves the functions that the amniotic fluid serves in a normal pregnancy and preferably has substantially the same composition. Solutions which mimic the amniotic fluid, such as, for example, lactated ringers solution are known.

In carrying out the present invention using the apparatus shown in the FIGURE, the liquid introduced through inlet 34 and sprayed onto placenta 15 through arm 36 to spray nozzles 38 comprises about 10% to about 30% human red blood cells by volume, an anti-coagulant, and nutrients. The red blood cells are preferably maternal and most preferably are provided as maternal whole blood which contains substances such as, for example, antibodies, leukocytes, and hormones. The concentration of red blood cells in whole blood is typically from about 35% to about 40 t and preferably is diluted to a concentrate in the range of about lot to about 30% (most preferably about 25 t) by a nutrient containing solution. The resulting preferred composition contains a nutrient solution in a concentration of about 35%. The anti-coagulant must not pass the placental barrier, and heparin, which meets this criterion, is the preferred anticoagulant.

A suitable nutrient solution is one which is equivalent to nutrient medium composition given in feeding patients intravenously for hyperalimentation, which is already done in premature neonates.

The red blood cells being circulated over the placenta release oxygen and the liquid containing the oxygen-depleted red blood cells is removed through outlet 46 and is recirculated and re-oxygenated. Apparatus suitable f or this purpose is well known in the art, one example of which is described in U.S. Pat. No. 4,791,054 to Hamada et al., the disclosure of which is hereby incorporated by reference.

In a preferred method of carrying out the present invention the red blood cells are re-oxygenated by passing them through an atmosphere of oxygen in contact with the placenta. As shown in the FIGURE, the red blood cells in the spray from nozzles 38 are contacted with oxygen-containing gas, preferably about 100% oxygen in chamber 16.

Oxygen in a low continuous flow, for example about one liter per minute, is introduced into chamber 16 through gas inlet 42, and a mixture of oxygen and carbon dioxide which diffuses out of the placenta is removed from chamber 16 through gas outlet 44.

Having thus described the present invention, the following example is offered to illustrate it in more detail.

EXAMPLE

A composition is prepared which contains about 25% red blood cells by volume by diluting one liter of whole blood containing about 40% red blood cells by volume with 600 ml of a solution containing nutrients to provide a solution containing about 25% red blood cells by volume. Heparin is added to the composition in an amount effective as an anti-coagulant. The resulting composition is withdrawn, recycled and sprayed at a rate of about 200 to about 1000 ml per minute depending on the size of the baby through a substantially 100% oxygen atmosphere onto a placenta as shown in the FIGURE.

What is claimed is:

1. A method of supporting the life of a human baby which has been born too prematurely to have functioning lungs, wherein the baby remains attached to its placenta through its umbilical cord, said method comprising:

maintaining the placenta in a moist, oxygen-containing environment, and spraying onto the placenta a fluid composition containing approximately 35% nutrients in liquid form, whole human blood containing approximately 10% to 30% red blood cells by volume, 1000 units of an anti-coagulant per liter of said nutrients in liquid form, and the remainder comprising blood serum, said nutrients in liquid form comprising effective amounts of amino acids, carbohydrates, lipids, vitamins, minerals and electrolytes.

2. The method according to claim 1 wherein said environment consists essentially of water vapor and oxygen.

3. The method according to claim 1 wherein said composition contains approximately 25% red blood cells by volume.

4. The method according to claim 1 wherein said composition comprises whole human blood diluted with nutrients in liquid form to comprise approximately 25% red blood cells by volume.

5. The method according to claim 4 wherein said whole human blood is maternal blood.

* * * * *